United States Patent
Levi et al.

(10) Patent No.: US 11,271,874 B2
(45) Date of Patent: Mar. 8, 2022

(54) NETWORK ADAPTER WITH TIME-AWARE PACKET-PROCESSING PIPELINE

(71) Applicant: MELLANOX TECHNOLOGIES, LTD., Yokneam (IL)

(72) Inventors: Dotan David Levi, Kiryat Motzkin (IL); Avi Urman, Yokneam Illit (IL); Lior Narkis, Petah-Tikva (IL); Liron Mula, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/782,075

(22) Filed: Feb. 5, 2020

(65) Prior Publication Data
US 2021/0243140 A1 Aug. 5, 2021

(51) Int. Cl.
*H04L 12/861* (2013.01)
*H04L 49/90* (2022.01)
(Continued)

(52) U.S. Cl.
CPC .......... *H04L 49/90* (2013.01); *H04L 12/4633* (2013.01); *H04L 45/745* (2013.01);
(Continued)

(58) Field of Classification Search
CPC ... H04L 49/90; H04L 47/2441; H04L 47/245; H04J 3/0667
(Continued)

(56) References Cited

U.S. PATENT DOCUMENTS

| 6,212,197 B1 | 4/2001 | Christensen et al. |
| 6,564,267 B1 * | 5/2003 | Lindsay .................. H04L 29/06 370/465 |

(Continued)

FOREIGN PATENT DOCUMENTS

| AU | 2012216611 B2 | 3/2013 | |
| CN | 103354989 A * | 10/2013 | ............. H04L 69/22 |

(Continued)

OTHER PUBLICATIONS

IEEE Instrument and Measurement Society, "IEEE Standard for a Precision Clock Synchronization Protocol of Networked Measurement and Control Systems", IEEE Std 1588-2008, Jul. 2008 (Year: 2008).*

(Continued)

*Primary Examiner* — Ondrej C Vostal
(74) *Attorney, Agent, or Firm* — Kligler & Associates Patent Attorneys Ltd

(57) ABSTRACT

A network adapter includes a host interface configured to communicate with a host, a network interface configured to communicate with a communication network, and packet processing circuitry. The packet processing circuitry is configured to receive a packet from the host via the host interface, or from the communication network via the network interface, to receive an indication of a network time used for synchronizing network elements in the communication network, to match the packet to a rule, the rule including a condition and an action, and to perform the action in response to the packet meeting the condition, wherein one or more of (i) the condition in the rule and (ii) the action in the rule, depend on the network time.

25 Claims, 2 Drawing Sheets

(51) Int. Cl.
    *H04L 45/745* (2022.01)
    *H04L 69/22* (2022.01)
    *H04W 56/00* (2009.01)
    *H04L 29/06* (2006.01)
    *H04L 47/10* (2022.01)
    *H04L 12/46* (2006.01)
    *H04L 49/00* (2022.01)

(52) U.S. Cl.
    CPC .............. *H04L 47/10* (2013.01); *H04L 49/70* (2013.01); *H04L 63/0263* (2013.01); *H04L 69/22* (2013.01); *H04W 56/0075* (2013.01)

(58) Field of Classification Search
    USPC .......................................................... 709/250
    See application file for complete search history.

(56) References Cited

U.S. PATENT DOCUMENTS

| | | | |
|---|---|---|---|
| 6,816,492 B1* | 11/2004 | Turner | H04L 49/1515 370/394 |
| 6,954,432 B1 | 10/2005 | Bychowsky et al. | |
| 7,224,669 B2 | 5/2007 | Kagan et al. | |
| 7,245,627 B2 | 7/2007 | Goldenberg et al. | |
| 7,676,597 B2 | 3/2010 | Kagan et al. | |
| 8,370,675 B2 | 2/2013 | Kagan | |
| 9,390,056 B1* | 7/2016 | Noureddine | H04L 45/16 |
| 9,397,960 B2 | 7/2016 | Arad et al. | |
| 9,450,846 B1 | 9/2016 | Huang et al. | |
| 9,667,446 B2* | 5/2017 | Worrell | H04L 12/6418 |
| 10,027,601 B2 | 7/2018 | Narkis et al. | |
| 10,187,400 B1* | 1/2019 | Castro | H04L 63/1425 |
| 10,284,383 B2 | 5/2019 | Bloch et al. | |
| 10,320,508 B2 | 6/2019 | Shimizu et al. | |
| 10,727,966 B1* | 7/2020 | Izenberg | H04J 3/0667 |
| 2003/0002483 A1* | 1/2003 | Zwack | H04J 3/0673 370/352 |
| 2004/0174820 A1* | 9/2004 | Ricciulli | H04L 47/2441 370/245 |
| 2006/0153179 A1* | 7/2006 | Ho | H04L 49/35 370/386 |
| 2008/0298380 A1* | 12/2008 | Rittmeyer | H04L 47/245 370/412 |
| 2012/0201248 A1 | 8/2012 | Aoki | |
| 2014/0379714 A1* | 12/2014 | Hankins | G06F 11/0751 707/737 |
| 2015/0046741 A1* | 2/2015 | Yen | G06F 1/14 713/400 |
| 2015/0055508 A1* | 2/2015 | Ashida | H04L 69/324 370/254 |
| 2015/0318015 A1* | 11/2015 | Bose | A63F 13/212 386/248 |
| 2017/0171362 A1* | 6/2017 | Bolotov | H04L 63/0263 |
| 2017/0331926 A1 | 11/2017 | Raveh et al. | |
| 2018/0124812 A1 | 5/2018 | Thubert et al. | |
| 2018/0191629 A1 | 7/2018 | Biederman et al. | |
| 2019/0056972 A1* | 2/2019 | Zhou | G06F 11/3476 |
| 2019/0124524 A1* | 4/2019 | Gormley | H04W 24/02 |
| 2019/0319730 A1 | 10/2019 | Webb et al. | |
| 2019/0379714 A1 | 12/2019 | Levi et al. | |
| 2020/0252320 A1 | 8/2020 | Zemach et al. | |

FOREIGN PATENT DOCUMENTS

| | | | | |
|---|---|---|---|---|
| EP | 0607412 B1 * | 1/1999 | ............. | H04L 29/06 |
| EP | 0917805 B1 * | 4/2005 | ............. | H04H 40/09 |
| JP | 2007042145 A * | 2/2007 | | |
| WO | 9857497 A1 | 12/1998 | | |

OTHER PUBLICATIONS

Mills, "Internet Time Synchronization: The Network Time Protocol", 1991 (Year: 1991).*

Mills, "Network Time Protocol (Version 3) Specification, Implementation and Analysis", RFC 1305, 1992 (Year: 1992).*
Mills, "Network Time Protocol (NTP)", RFC 0958, 1985 (Year: 1985).*
Mills, "Network Time Protocol (version 1) specification and implementation", RFC 1059, 1988 (Year: 1988).*
Baboescu et al., "Scalable Packet Classification", 2001 (Year: 2001).*
Bader et al., "Survey and Comparison of Open Source Time Series Databases", 2017 (Year: 2017).*
Cross et al., "Receiving filtering for communication interface", WO2001037489A1, 2001 (Year: 2001).*
Davie et al., "An Expedited Forwarding PHB (Per-Hop Behavior)", RFC 3246, 2002 (Year: 2002).*
Sherer et al., "Network adapter that manages host interrupt signals and host indication signals", JPH08506674A, 1993 (Year: 1993).*
Smith et al., "Gigabit Ethernet adapter supporting ISCSI and IPSEC protocols", JP2005529523A, 2005 (Year: 2005).*
Yau et al., "Development of Situation-Aware Application Software for Ubiquitous Computing Environments", 2002 (Year: 2002).*
IEEE Standard 1588-2008, "IEEE Standard for a Precision Clock Synchronization Protocol for Networked Measurement and Control Systems", pp. 1-289, year 2008.
Weibel et al., "Implementation and Performance of Time Stamping Techniques", 2004 Conference on IEEE 1588, pp. 1-29, Sep. 28, 2004.
InfiniBandTM Architecture Specification vol. 1, Release 1.2.1,pp. 1-1727, Nov. 2007.
Lu et al., "A Fast CRC Update Implementation", Computer Engineering Laboratory, Electrical Engineering Department, pp. 113-120, Oct. 8, 2003.
Mellette et al., "Toward Optical Switching in the Data Center", IEEE 19th International Conference on High Performance Switching and Routing (HPSR), pp. 1-6, Bucharest, Romania, Jun. 18-20, 2018.
Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.
O-RAN Alliance, "O-RAN Fronthaul Working Group; Control, User and Synchronization Plane Specification", ORAN-WG4 CUS. 0-v01.00, Technical Specification, pp. 1-189, year 2019.
Vattikonda et al., "Practical TDMA for Datacenter Ethernet", EuroSys conference, Bern, Switzerland, pp. 225-238, Apr. 10-13, 2012.
Ericsson AB et al., "'Common Public Radio Interface: eCPRI Interface Specification", V2.0, pp. 1-109, May 10, 2019.
Xilinx Inc., "Radio over Ethernet Framer v2.1", PB056 (v2.1), pp. 1-9, Oct. 30, 2019.
Weibel, H., "High Precision Clock Synchronization according to IEEE 1588 Implementation and Performance Issues", Zurich University of Applied Sciences, pp. 1-9, Jan. 17, 2005.
Sanchez-Palencia, J., "[RFC,v3,net-next,00/18] Time based packet transmission", pp. 1-14, Mar. 7, 2018.
IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.
Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.
Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.
Wikipedia,Precision Time Protocol, pp. 1-9, Apr. 20, 2020.
SMPTE Standard, "Professional Media Over Managed IP Networks:Traffic Shaping and Delivery Timing for Video", The Society of Motion Picture and Television Engineers, pp. 1-17, Nov. 22, 2017.
Wikipedia, "Time-Sensitive Networking", pp. 1-12, Mar. 5, 2020.
U.S. Appl. No. 16/910,193 Office Action dated Jul. 7, 2021.
EP Application # 21181591.5 Search Report dated Sep. 17, 2021.

(56) References Cited

OTHER PUBLICATIONS

U.S. Appl. No. 16/910,193 Office Action dated Dec. 17, 2021.
U.S. Appl. No. 16/921,993 Office Action dated Dec. 22, 2021.

* cited by examiner

NETWORK ADAPTER WITH TIME-AWARE PACKET-PROCESSING PIPELINE

FIELD OF THE INVENTION

The present invention relates generally to packet networks, and particularly to time-aware packet processing in network adapters.

BACKGROUND OF THE INVENTION

Various techniques for processing packets in network adapters are known in the art. For example, U.S. Pat. No. 9,397,960 describes methods for steering packets, including receiving a packet and determining parameters to be used in steering the packet to a specific destination, in one or more initial steering stages, based on one or more packet specific attributes. The methods further include determining an identity of the specific destination of the packet in one or more subsequent steering stages, governed by the parameters determined in the one or more initial stages and one or more packet specific attributes, and forwarding the packet to the determined specific destination.

U.S. Pat. No. 10,027,601 describes techniques for flow-based packet modification. In some embodiments a communication apparatus includes a host interface, which is configured to be connected to a peripheral component bus, and a network interface, which is configured to be connected to a network. Packet processing circuitry is coupled between the host interface and the network interface and is configured to receive from a first interface, selected from among the host interface and the network interface, a data packet comprising a header containing multiple fields having respective values, to identify, responsively to a value of at least one of the fields, a corresponding entry in a header modification table, and to modify the header in accordance with the identified entry. The data packet with the modified header is transmitted through a second interface selected from among the host interface and the network interface.

SUMMARY OF THE INVENTION

An embodiment of the present invention that is described herein provides a network adapter including a host interface configured to communicate with a host, a network interface configured to communicate with a communication network, and packet processing circuitry. The packet processing circuitry is configured to receive a packet from the host via the host interface, or from the communication network via the network interface, to receive an indication of a network time used for synchronizing network elements in the communication network, to match the packet to a rule, the rule including a condition and an action, and to perform the action in response to the packet meeting the condition, wherein one or more of (i) the condition in the rule and (ii) the action in the rule, depend on the network time.

In some embodiments, the network adapter further includes a hardware clock that is synchronized to the network time and is configured to provide the indication of the network time to the packet processing circuitry. In some embodiments, the network adapter further includes a time-stamping circuit that is configured to insert the indication of the network time into the packet upon arrival of the packet to the network adapter, or upon departure of the packet from the network adapter.

Typically, the packet processing circuitry is configured to match the packet to the rule by (i) determining first and second time values, at least one of which being derived from the network time, (ii) extending the first time value to a range of time values, and (iii) comparing the range of time values to the second time value. In various embodiments, the first and second time values are selected from a list including: a time indicated in the packet; an arrival time of the packet to the network adapter; a departure time of the packet from the network adapter; a time value specified in the rule; and a current value of the network time.

In an embodiment, upon a successful match to the rule, the packet processing circuitry is configured to control a departure time of the packet from the network adapter depending on the network time. In another embodiment, upon a successful match to the rule, the packet processing circuitry is configured to modify a time field in the packet depending on the network time. In yet another embodiment, upon a successful match to the rule, the packet processing circuitry is configured to insert into the packet a time field depending on the network time. In another embodiment, upon a successful match to the rule, the packet processing circuitry is configured to update statistical information depending on the network time.

In some embodiments, by dependence on the network time, the packet processing circuitry is configured to match the packet to the rule synchronously with application of another rule is another network device in the communication network. In a disclosed embodiment, the condition in the rule depends on the network time and on a value of a counter in the network adapter. In an example embodiment, the packet processing circuitry is configured to match the packet to the rule by comparing a time value, which depends on the network time, to a periodic time range.

There is additionally provided, in accordance with an embodiment of the present invention, a method for packet processing including, in a network adapter, receiving a packet from a host via a host interface, or from a communication network via a network interface. An indication of a network time, used for synchronizing network elements in the communication network, is received in the network adapter. The packet is matched to a rule using a match engine in the network adapter, the rule including a condition and an action, and the action is performed in response to the packet meeting the condition. One or more of (i) the condition in the rule and (ii) the action in the rule, depend on the network time.

The present invention will be more fully understood from the following detailed description of the embodiments thereof, taken together with the drawings in which:

DETAILED DESCRIPTION OF EMBODIMENTS

Overview

Figure 1:
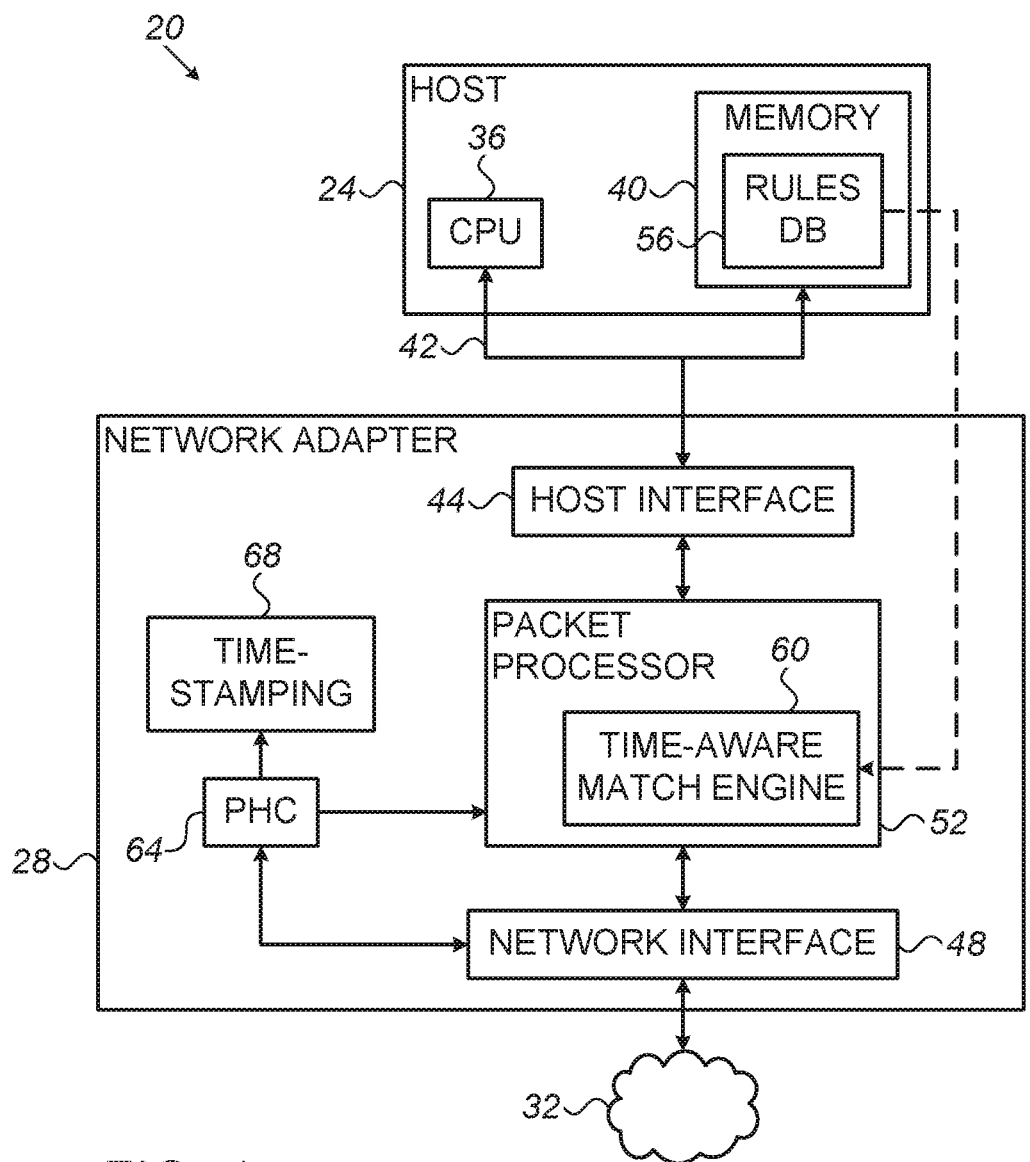
FIG. 1 is a block diagram that schematically illustrates a computing and communication system, in accordance with an embodiment of the present invention.

Embodiments of the present invention that are described herein provide improved methods and systems for processing packets in network adapters. In the disclosed embodiments, a network adapter comprises a host interface for connecting to a host, a network interface for connecting to a communication network, and packet processing circuitry configured to process packets received from the host and/or from the network.

The packet processing circuitry comprises a match engine, typically implemented as a hardware pipeline, which is configured to match packets to a set of rules. A typical rule comprises a condition, and an action that is applied if the packet meets the condition.

In the embodiments disclosed herein, the match engine is time-aware, in the sense that one or more of the conditions specified in the rules, and/or one or more of the actions specified in the rules, depend on the network time. In the present context, the term "network time" refers to a common time-base that is used for synchronizing elements of the network to one another. The Precision-Time-Protocol (PIP), specified in the IEEE 1588 family of standards, is one example of a scheme for synchronizing network elements to a common network time.

In various embodiments, the match engine can be made aware of the network time in various ways. In some embodiments the network adapter comprises a hardware clock that is synchronized to the network time, e.g., a PTP Hardware Clock (PHC). The match engine may receive an indication of the network time directly from the PHC, and/or the PHC may be used for inserting timestamps into packets upon arrival or departure. In other embodiments, the network adapter comprises a free-running clock. In these embodiments, software running on the host may query the free-running clock (e.g., periodically) and correlate the value of the free-running clock with the network time. Having established this correlation, the host software can translate any desired network time to a corresponding value of the free-running clock.

Network-time dependent conditions may comprise, for example, declaring a match if the packet arrival time is before a specified time, during a specified time window, or after a specified time, or declaring a match if the packet carries a timestamp that differs from the packet's arrival time by more than a specified difference. Network-time dependent actions may comprise, for example, forcing a packet to depart before a specified time, at a specified time or after a specified time, modifying a timestamp in the packet in a specified way, inserting a timestamp into the packet, or updating a histogram that tracks the distribution of packet times of arrival. As can be appreciated, the above conditions and actions are only a few demonstrative, non-limiting examples.

In practice, many network-time dependent conditions can be formulated as a comparison between a time value (e.g., the current network time) and a time range extended from another time value (e.g., a time range around the packet arrival or departure time). In some embodiments the match engine evaluates the condition in a rule using this format, e.g., determines a first time value, extends it to form a time range, and compares a second time value to this time range.

The use of a network-time aware match engine enables network adapters to perform powerful packet processing operations that are useful in a wide variety of use cases. Several characteristic examples are described herein.

System Description

FIG. 1 is a block diagram that schematically illustrates a computing and communication system 20, accordance with an embodiment of the present invention. System 20 comprises a host computer 24, e.g., a server, a workstation, or any other suitable computing platform. Host computer 24 (also referred to herein simply as "host") uses a network adapter 28 for communicating over a communication network 32. Network 32 may comprise, for example, an Internet Protocol (IP) network or an Infiniband™ (IB) network. Depending on the applicable network protocol, network adapter 28 may be referred to, for example, as a Network Interface Controller (NIC) or a Host Channel Adapter (HCA), for example.

Host 24 comprises a Central Processing Unit (CPU) 36 and a host memory 40, typically a Random Access Memory (RAM). Network adapter 28 comprises a host interface 44 for communicating with host 24. In the present example, host interface 44 communicates with CPU 36 and with memory via a peripheral interconnect bus 42, e.g., a Peripheral Component Interconnect Express (PCIe) bus. Network adapter further comprises network interface 48 for communicating with network 32.

In some embodiments, network adapter 28 comprises a packet processor 52 that processes packets received from host 24 via interface 44, and/or from network 32 via interface 48. Typically, packet processor 52 transmits and receives packets associated with flows. Each flow may correspond to a Queue Pair (QP), to an Ethernet ring or to an IP tuple, for example.

Packet processor 52 comprises a match engine 60 that is configured to match packets to a set of rules. Typically, each rule specifies a condition and an action to be performed if a packet matches the condition. Conditions in rules may, for example, specify matching of one or more packet header fields, such as Ethertype, port number, protocol, source or destination IP or MAC address, VLAN tag or priority, upper layer (e.g., layer-4) source/destination address or port, Type of Service (TOS), or any other suitable field. Actions in rules may comprise, for example, dropping a packet, allowing a packet to proceed, forwarding a packet to a specified queue or port, modifying or adding a field in the packet, encapsulating or decapsulating a packet. Other actions may comprise, for example, updating some statistics being collected, e.g., update a count of packets that match a rule, or update the aggregate data size, e.g., byte count, of packets that match a rule.

Match engine 60 is typically implemented as a hardware pipeline, and is therefore also referred to as a packet-processing pipeline. In an example embodiment, the set of rules is stored in a rules database 56 in host memory 40. A subset of the rules is cached in packet processor 52 and queried by match engine 60.

In some disclosed embodiments, packet processor 52 of network adapter 28 (and specifically match engine 60) is aware of, and synchronized to, the network time that governs system 20. For example, various network elements (e.g., switches or routers in network 32) may be synchronized to a common clock master (not shown) using PTP, and network adapter 28 is aware of this network time as well.

In an example embodiment, network adapter 28 comprises an internal PTP Hardware Clock (PHC) 64, typically implemented using an oscillator and a counter, the PHC clock synchronized using PTP to the clock master of system 20. Certain aspects of a hardware clock in a network adapter are addressed in U.S. patent application Ser. No. 16/779,611, entitled "Multihost Clock Synchronization," filed Feb. 2, 2020, which is assigned to the assignee of the present patent application and whose disclosure is incorporated herein by reference.

In an embodiment, network adapter 28 comprises a time-stamping circuit 68 that is connected to PHC 64 and inserts timestamps into packets. Time-stamping circuit 68 may, for example, mark a packet with an indication of the network time at which the packet arrives in network adapter 28, and/or with an indication of the network time at which the packet departs from network adapter 28. Additionally or alternatively, PHC 64 may provide match engine 60 a direct indication of the current network time. Thus, match engine 60 may be made aware of the network time by receiving packets marked with the network time, and/or by receiving the network time directly.

In alternative embodiments, instead of PHC 64, network adapter 28 comprises a free-running clock (not seen in the figures). In these embodiments, software running on host 24 may query the free-running clock (e.g., periodically or in response to some suitable trigger) and correlate the value of the free-running clock with the network time. Having established this correlation, the host software can translate any desired network time to a corresponding value of the free-running clock. The host may notify packet processor 52 of the translation. Additionally or alternatively, time-stamping circuit 68 may mark packets with indications of network times derived from the translation. In this manner, match engine 60 may be made time-aware without a need for an on-board PHC.

The configurations of host 24 and network adapter 28, shown in FIG. 1, are example configurations that are depicted purely for the sake of conceptual clarity. Any other suitable configurations can be used in alternative embodiments.

In various embodiments, the various elements of host 24 and network adapter 28 may be implemented using suitable hardware, such as one or more Application-Specific integrated Circuits (ASIC) or Field-Programmable Gate Arrays (FPGA), using software, or using a combination of hardware and software elements.

In some embodiments, certain elements of host 24 and/or network adapter 28, e.g., certain functions of packet processor 52, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Time-Aware Packet Processing in Network Adapter

As noted above, upon receiving a packet, match engine 60 matches the packet to a set of rules, e.g., to the rules in database 56 or parts thereof. Each rule comprises a condition, and an action to be performed if the packet matches the condition.

In some embodiments, for at least one of the rules, the condition and/or the action depends on the network time, as provided, for example, by PHC 64. Thus, for some rules, match engine 60 may find that a given packet matches the rule at a certain network time, but does not match the same rule at another network time. In some embodiments, a time-dependent rule may be implemented by a cascade of first and second rules. The first rule is typically not time-dependent, but rather identifies a specific flow, a specific source, or other suitable packet attribute or attributes. Packets that match the first rule are matched against the second rule, which is time-aware.

In various embodiments, a condition in a rule may depend on one or more of the following, for example:

A time of arrival of the packet in network adapter 28, as marked in the packet by time-stamping circuit 68.

A time of departure of the packet from network adapter 28, as marked in the packet by time-stamping circuit 68.

The current time, as provided by PHC 64.

A condition that depends on any of these time indications is regarded as depending on the network time. Additionally or alternatively, a condition may depend on the network time in any other suitable way.

A few non-limiting examples of conditions that depend on the network time comprise:

Declare a match if the packet arrival time is before a specified time.

Declare a match if the packet arrival time falls during a specified time window.

Declare a match if the packet arrival time is after a specified time.

Declare a match if the packet carries a timestamp that differs from the packet's arrival time by more than a specified difference.

Note that "packet arrival time" and "packet departure time" can be defined in various ways, because packet arrival and packet departure are multi-stage processes. In practice, it is not uncommon for a packet to travel via packet processor 52 for a time duration between several nanoseconds to several hundred nanoseconds. In some embodiments, time-stamping circuit 68 may time-stamp a packet with a "packet arrival time" in any of the packet arrival stages, possibly in multiple stages. Example types of packet arrival time may comprise (i) the time the packet processor completes Medium Access Control (MAC) processing of the packet, (ii) the time the packet processor completes decryption of the packet, (iii) the time the packet is scattered into the host, or any other suitable time. Any such time can be used for implementing time-aware rules. Different rules in the same rules database may use different types of packet arrival time, and/or different types of packet departure time. The distinction between different types of arrival time enables packet processor 52 to time-stamp a packet "close to the wire" (e.g., as close as possible to the point the packet is first assembled and recognized as a packet). The same holds for the packet departure time. This capability increases the time-stamping accuracy.

Further alternatively, any other suitable network-time dependent conditions can be used by match engine 60. As seen, in some cases the rule depends on a range of times, e.g., a range of arrival times. Processing of rules of this sort is elaborated below.

In some embodiments, a condition may depend on the network time in combination with dependence on one or more other features, e.g., a matching of packet header field values. For example, a condition in a rule may require that the destination IP address of a packet match a certain value, and that the packet arrival time fall in some specified range.

In some embodiments, a condition may depend on the network time in combination with a counter value in the network adapter. For example, a condition in a rule may require that the packet arrival/departure time is within a specified time difference from the time a counter value crosses a threshold.

The above network-time dependent match conditions are demonstrative, non-limiting examples of match conditions that may be specified in rules. Additionally or alternatively, time-aware match engine 60 may process any other suitable rules whose conditions depend on the network time.

Additional or alternatively, for at least one rule, the action specified in the rule may depend on the network time. As noted above, examples of dependence on network time may comprise, for example, dependence on packet arrival time, on packet departure time, on the current network time, and the like. Thus, for some rules, in case of a match, match engine 60 may apply a certain action for a certain network time, and a different action at another network time.

In one example embodiment, a rule may control the departure time of a packet from the network adapter depending on the network time. For example, a rule may specify that, upon a successful match, the departure of the matching packet be delayed until a predefined network time. As another example, a rule may specify that a matching packet be forced to depart the network adapter before a specified network time, and otherwise dropped and a notification sent to the host software.

In another embodiment, a rule may specify insertion of a time field into a matching packet depending on the network time. The inserted time value may comprise, for example, the arrival time of the packet, the departure time of the packet, a time specified in the rule, or the current network time.

In yet another embodiment, a rule may specify modification of a time field in a packet depending on the network time. For example, a rule may specify that, upon a successful match, a timestamp field in the matching packet be corrected, e.g., by adding a constant value thereto. This sort of action is useful, for example, for implementing the PTP "transparent clock" mechanism, in which a network element increments a timestamp in a traversing packet by the internal propagation time of the packet in the network element. Note that the disclosed modification is performed within the action pipeline of the packet processor. Typically, modifying a timestamp field warrants an update of a Cyclic Redundancy Check (CRC) field in the packet. In an embodiment, given that the timestamp is modified by addition of a known value, this known value can be used for updating the CRC. An example process of updating a CRC in response to such an addition is described by Lu and Wong, in "A Fast CRC Update Implementation," Proceedings of the 14$^{th}$ Annual Workshop on Circuits Systems and Signal Processing, November, 2003, pages 113-120.

Another rule may specify that a timestamp field in the matching packet be overwritten with a different value. Further additionally or alternatively, an action in a rule may update statistical information being collected, depending on the network time. For example, an action in a rule may specify that, upon a match, a certain counter be incremented. The counter may count, for example, the number of packets that match a respective rule, or the aggregate size of packets that match a respective rule. The counter may count bytes, packets or any other suitable data unit. This sort of mechanism is useful, for example, for constructing histograms and other statistical data structures, e.g., a histogram of packet arrival times for a predefined set of arrival-time ranges.

The above network-time dependent actions are demonstrative, non-limiting examples of actions that may be specified in rules. Additionally or alternatively, time-aware match engine 60 may process any other suitable rules whose actions depend on the network time.

In some embodiments, the disclosed techniques can be used for applying rules to packet in an atomic manner by two or more network devices (e.g., network adapters, network switches and the like). Since the various network devices are synchronized to the same network time, match engine 60 may apply a rule to a packet synchronously with another rule that is applied in another network device.

Figure 2:
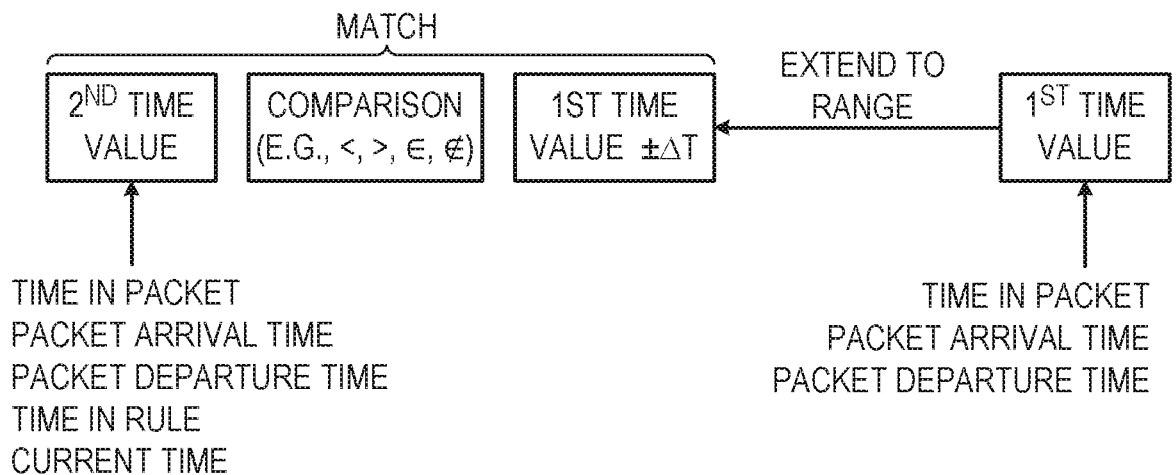
FIG. 2 is a diagram that schematically illustrates examples of time-aware rule matching in a network adapter, in accordance with an embodiment of the present invention.

FIG. 2 is a diagram that schematically illustrates examples of time-aware rule matching performed by match engine 60 in network adapter 28, in accordance with an embodiment of the present invention. As noted above, some rules can be formulated as a comparison between a time value and a time range extended from another time value.

Thus, in some embodiments match engine 60 matches a packet to a rule by (i) evaluating a first time value and a second time value, (ii) extending the first time value to form a time range, and (iii) comparing the second time value to the time range.

The first time value may comprise, for example, a time indicated by a timestamp in the packet, the arrival time of the packet or the departure time of the packet. The time range may have any suitable size. In the figure the time range is denoted $\pm\Delta T$, and is symmetric on both sides of the first time value. Alternatively, the time range may be one-sided, i.e., only below or only above the first time value. In some embodiments, the time range is configurable.

The second time value may comprise, for example, a time indicated by a timestamp in the packet, the arrival time of the packet, the departure time of the packet, a time specified in the rule, or the current network time.

The comparison between the second time value and the range may be performed using any suitable comparison operator, e.g., $<$, $>$, $\in$ or $\notin$. In other words, match engine 60 may evaluate the condition by checking whether the second time value falls below the time range, above the time range, inside the time range or outside the time range, for example.

In some embodiments, match engine 60 compares a time value to a periodic time range, e.g., by including a masking operation in the comparison. Consider, for example, a condition that declares a match if the time value is within the first 300 microseconds of a round second. Match engine 60 may evaluate such a condition, for example, by (i) masking the bits of the time value that correspond to values above 1 second, and (ii) checking whether the masked time value is smaller than 300 microseconds. Comparison to a periodic time range is useful, for example, for correcting drifts in a periodic streaming application. In video streaming, for example, a video frame should be streamed every 16 milliseconds. By comparing the arrival/departure time to a periodic time range of $\pm 1$ microseconds every 16 milliseconds, the start times of the video frames can be aligned to correct drift. Alternatively, comparison to a periodic time range, by masking or otherwise, can be used in any other suitable use-case.

Figure 3:
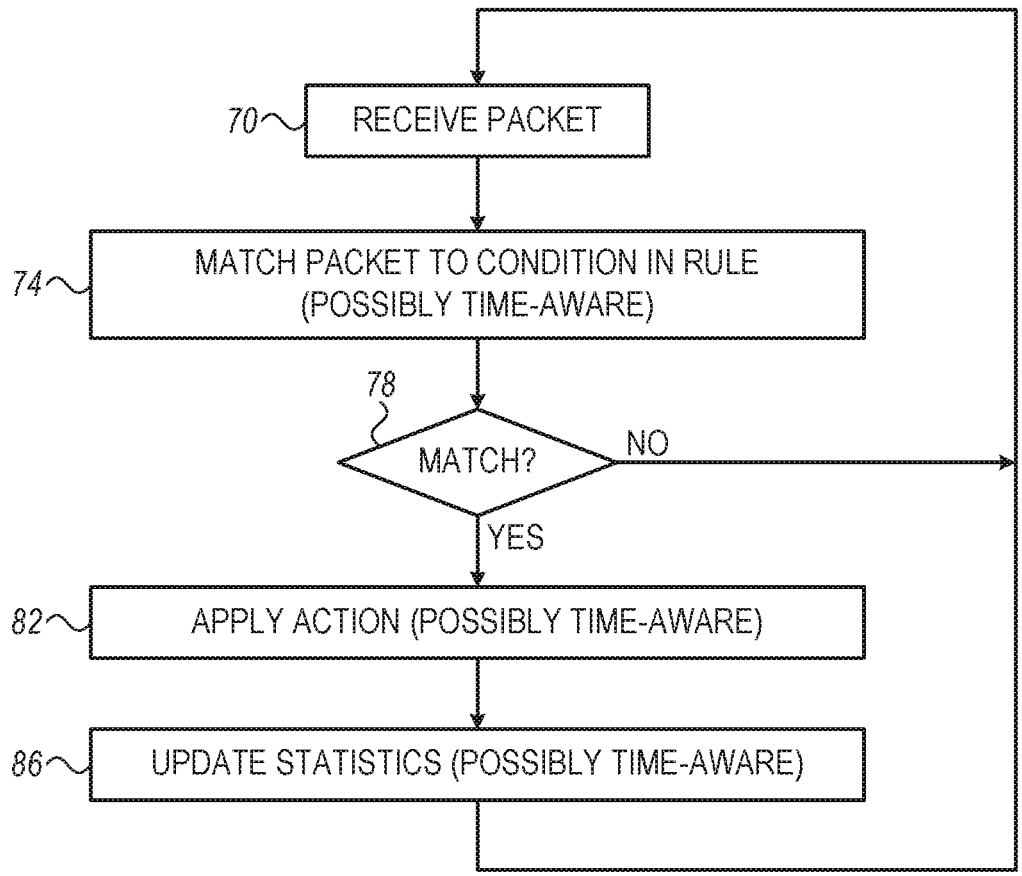
FIG. 3 is a flow chart that schematically illustrates a method for time-aware packet processing in a network adapter, in accordance with an embodiment of the present invention.

FIG. 3 is a flow chart that schematically illustrates a method for time-aware packet processing in network adapter 28, in accordance with an embodiment of the present invention. For clarity, the flow chart refers to a single packet and a single rule. In practice, network adapter 28 typically processes a large number of packets and a large number of rules, possibly in parallel.

The method of FIG. 3 begins with network adapter 28 receiving a packet, at a reception step 70. The packet may arrive from host 24 via host interface 44, or from network 32 via network interface 48.

At a matching step 74, match engine 60 attempts to match the packet to the condition in a rule. In some embodiments the condition depends on the network time as explained above.

At a checking step 78, match engine 60 checks whether the match is successful. If not, the method loops back to step 70 above. In response to a successful match, match engine 60 applies the action specified in the rule, at an action step 82. In some embodiments the action depends on the network time as explained above.

In some embodiments, although not necessarily, match engine 60 then updates statistics being collected, at a statistics updating step 86. In some embodiments the statistics depends on the network time as explained above. The method loops back to step 70 above.

Although the embodiments described herein mainly address Ethernet and Infiniband network adapters, the methods and systems described herein can also be used in other applications, such as in enhanced Common Public Radio interface (eCPRI) equipment, Open vSwitch (OVS) offloading applications, Dynamic Adaptive Streaming over HTTP (DASH)—Also referred to as MPEG-DASH, telemetry applications that send events periodically, as well as time-sensitive applications such as Time-Sensitive Networking (TSN) communication and Society of Motion Picture and Television Engineers (SMPTE) 2110 video transmission.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
 a hardware-implemented host interface configured to communicate with a host;
 a hardware-implemented network interface configured to communicate with a communication network; and
 packet processing circuitry, configured to:
  receive a packet from the host via the host interface, or from the communication network via the network interface;
  receive an indication of a network time that serves as a common time-base for synchronizing network elements in the communication network; and
  match the packet to a rule, the rule comprising a condition and an action, and perform the action in response to the packet meeting the condition, wherein the condition in the rule includes a comparison of a first value of the network time to a periodic time-range defined relative to a second value of the network time obtained by masking selected bits of the first value of the network time to generate a masked time value and comparing the masked time value to the second value of the network time.

2. The network adapter according to claim 1, further comprising a hardware clock that is synchronized to the network time and is configured to provide the indication of the network time to the packet processing circuitry.

3. The network adapter according to claim 1, further comprising a timestamping circuit that is configured to insert the indication of the network time into the packet upon arrival of the packet to the network adapter, or upon departure of the packet from the network adapter.

4. The network adapter according to claim 1, wherein the first and second values of the network time are selected from a list comprising:
 a time indicated in the packet;
 an arrival time of the packet to the network adapter;
 a departure time of the packet from the network adapter;
 a time value specified in the rule; and
 a current value of the network time.

5. The network adapter according to claim 1, wherein, upon a successful match to the rule, the packet processing circuitry is configured to control a departure time of the packet from the network adapter depending on the network time.

6. The network adapter according to claim 1, wherein, upon a successful match to the rule, the packet processing circuitry is configured to modify a time field in the packet depending on the network time.

7. The network adapter according to claim 1, wherein, upon a successful match to the rule, the packet processing circuitry is configured to insert into the packet a time field depending on the network time.

8. The network adapter according to claim 1, wherein, upon a successful match to the rule, the packet processing circuitry is configured to update statistical information depending on the network time.

9. The network adapter according to claim 1, wherein, by dependence on the network time, the packet processing circuitry is configured to match the packet to the rule synchronously with application of another rule is another network device in the communication network.

10. The network adapter according to claim 1, wherein the condition in the rule depends on the network time and on a value of a counter in the network adapter.

11. The network adapter according to claim 1, wherein the packet is a part of a stream of packets transmitted in a periodic streaming application, and wherein the packet processing circuitry is configured to align a start time of the packet responsively to the comparison in order to correct a drift in the application.

12. A method for packet processing, comprising:
 in a network adapter, receiving a packet from a host via a host interface, or from a communication network via a network interface;
 receiving in the network adapter an indication of a network time that serves as a common time-base for synchronizing network elements in the communication network; and
 matching the packet to a rule using a match engine in the network adapter, the rule comprising a condition and an action, and performing the action in response to the packet meeting the condition, wherein the condition in the rule includes a comparison of a first value of the network time to a periodic time-range defined relative to a second value of the network time obtained by masking selected bits of the first value of the network time to generate a masked time value and comparing the masked time value to the second value of the network time.

13. The method according to claim 12, wherein receiving the indication of the network time comprises receiving the indication from a hardware clock in the network adapter that is synchronized to the network time.

14. The method according to claim 12, further comprising inserting the indication of the network time into the packet upon arrival of the packet to the network adapter, or upon departure of the packet from the network adapter.

15. The method according to claim 12, wherein the first and second values of the network time are selected from a list comprising:
   a time indicated in the packet;
   an arrival time of the packet to the network adapter;
   a departure time of the packet from the network adapter;
   a time value specified in the rule; and
   a current value of the network time.

16. The method according to claim 12, wherein performing the action comprises, upon a successful match to the rule, controlling a departure time of the packet from the network adapter depending on the network time.

17. The method according to claim 12, wherein performing the action comprises, upon a successful match to the rule, modifying a time field in the packet depending on the network time.

18. The method according to claim 12, wherein performing the action comprises, upon a successful match to the rule, inserting into the packet a time field depending on the network time.

19. The method according to claim 12, wherein performing the action comprises, upon a successful match to the rule, updating statistical information depending on the network time.

20. The method according to claim 12, matching the packet to the rule is performed synchronously with application of another rule is another network device in the communication network.

21. The method according to claim 12, wherein the condition in the rule depends on the network time and on a value of a counter in the network adapter.

22. A network adapter, comprising:
   a hardware-implemented host interface configured to communicate with a host;
   a hardware-implemented network interface configured to communicate with a communication network; and
   packet processing circuitry, configured to:
      receive a packet from the host via the host interface, or from the communication network via the network interface;
      receive an indication of a network time that serves as a common time-base for synchronizing network elements in the communication network; and
      match the packet to a rule, the rule comprising a condition and an action, and perform the action in response to the packet meeting the condition, wherein the action in the rule includes forcing the packet to depart from the network adapter at a time that is specified based on the network time.

23. A method for packet processing, comprising:
   in a network adapter, receiving a packet from a host via a host interface, or from a communication network via a network interface;
   receiving in the network adapter an indication of a network time that serves as a common time-base for synchronizing network elements in the communication network; and
   matching the packet to a rule using a match engine in the network adapter, the rule comprising a condition and an action, and performing the action in response to the packet meeting the condition, wherein the action in the rule includes forcing the packet to depart from the network adapter at a departure time that is specified based on the network time.

24. The network adapter according to claim 22, wherein the action in the rule includes delaying a departure of the packet from the network adapter until the network time reaches a predefined value.

25. The network adapter according to claim 22, wherein the action in the rule comprises forcing the packet to depart from the network adapter before the network time reaches a predefined value, and otherwise dropping the packet.

* * * * *